United States Patent
Ranjan et al.

(10) Patent No.: US 6,977,891 B1
(45) Date of Patent: Dec. 20, 2005

(54) METHOD AND SYSTEM FOR MULTICAST TRAFFIC REDUCTION

(75) Inventors: Ashish Ranjan, Sunnyvale, CA (US); Desikan Saravanan, Santa Clara, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 873 days.

(21) Appl. No.: 09/895,110

(22) Filed: Jun. 30, 2001

(51) Int. Cl.[7] .............................................. H04J 1/16
(52) U.S. Cl. ....................................... 370/229; 370/235
(58) Field of Search ........................ 370/229, 235–236, 370/236.2, 312, 351–353, 355–356, 395.31, 370/395.52, 400–401, 432, 381

(56) References Cited

U.S. PATENT DOCUMENTS 6,614,787 B1 * 9/2003 Jain et al. .................... 370/390
6,654,371 B1 * 11/2003 Dunstan et al. ............. 370/390

\* cited by examiner

*Primary Examiner*—Chi Pham
*Assistant Examiner*—Viet Le
(74) *Attorney, Agent, or Firm*—Blakely Sokoloff Taylor & Zafman LLP

(57) ABSTRACT

A method is provided to reduce multicast traffic by snooping IGMP control packets on a packet-forwarding device. A multicast traffic reducer includes an IGMP proxy, which operates in conjunction with an IGMP snooper to intercept selected IGMP control packets and generate proxy IGMP control packets in their place. The IGMP proxy may include an IGMP query batcher to consolidate IGMP queries to multicast host groups, an IGMP query responder to consolidate host responses to the IGMP queries to multicast host groups, and/or an IGMP leave forwarder to manage host IGMP leave packets. The IGMP proxy consolidates or discards host-generated IGMP control packets and timely generates IGMP proxy control packets in their place. The IGMP proxy further includes an IGMP layer-2 query generator to initiate IGMP queries for a layer-2 router multicast application.

12 Claims, 7 Drawing Sheets

METHOD AND SYSTEM FOR MULTICAST TRAFFIC REDUCTION

FIELD OF THE INVENTION

The present invention relates to the field of network management technologies. In particular, the present invention relates to the reduction of multicast traffic by snooping Internet Group Management Protocol packet data.

BACKGROUND AND DESCRIPTION OF RELATED ART

The following excerpt from Request For Comment (RFC) 1112 describes the concepts underlying multicast routing.

> [Internet Protocol] IP multicasting is the transmission of an IP datagram to a "host group", a set of zero or more hosts identified by a single IP destination address. The membership of a host group is dynamic; that is, hosts may join and leave groups at any time. There is no restriction on the location or number of members in a host group. A host may be a member of more than one group at a time. A host need not be a member of a group to send datagrams to it.... Internetwork forwarding of IP multicast datagrams is handled by "multicast routers."

Deering, S., Introduction, pps. 1–2, "*Host Extensions for IP Multicasting*", STD 5, RFC 1112, August 1989.

The Internet Group Management Protocol (IGMP) is an Internet protocol that provides a way for host to report its multicast group membership to adjacent multicast routers. IGMP is formally documented by the Network Working Group of the Internet Engineering Task Force in RFC 2236, Fenner, W., "*Internet Group Management Protocol*," Version 2, RFC 2236, November 1997.

Simply put, multicasting allows one computer on the Internet to send content to multiple other computers that have identified themselves as interested in receiving the originating computer's content. Multicasting can be used for such applications as updating the address books of mobile computer users in the field, sending out company newsletters to a distribution list, and "broadcasting" high-bandwidth programs of streaming media to an audience that has "tuned in" by setting up a multicast group membership. Other examples include using multicast routing for digital cable television to broadcast content such as Home Box Office (HBO) content to viewers tuned to HBO or Showtime to viewers tuned to Showtime, or for broadcasting a digital video conference to conference participants. The host group can include devices that reside on a local network, within a private network, or outside of the local network.

IP multicast routing includes the following components:

A layer-2 router that can forward IP multicast packets to and from other layer-2 or layer-3 routers, and to destination IP hosts in the host group;

A layer-3 router-to-router multicast routing protocol for forwarding the IP multicast packets between routers (for example, the Distance Vector Multicast Routing Protocol (DVMRP) or the Protocol Independent Multicast (PIM) protocol); and A layer-2 host-to-router protocol for the IP host to communicate its multicast group membership to a router (for example, the IGMP protocol).

There are three primary types of IGMP control packets transmitted between the routers and between the host and the routers: query, join, and leave. During operation, a router generates an IGMP query to the multicast group to see if the group is still in use. For example, in the digital cable television application of multicast traffic routing, the layer-3 multicast router that is forwarding the HBO content for the cable provider periodically sends an IGMP query control packet to the layer-2 router (i.e. the switch) which triggers the generation of multiple IGMP queries by the switch to all of the member hosts of a multicast group to determine whether the HBO group on that switch is still active. If not, then the digital cable provider need no longer send the HBO content to that switch. The IGMP join and leave packets are generated by the host. A host joins a multicast group by sending an IGMP join packet to the switch, which in turn forwards it to the multicast router. Likewise, a host leaves a multicast group by sending an IGMP leave packet to the switch, which in turn forwards it to the multicast router.

One of the drawbacks to supporting multicast routing is the high volume of traffic that can be generated when broadcasting the IP multicast data packets (e.g. the HBO content) to the members of host groups, especially since the IP multicast data packets are sent over the costly links between the layer-3 and layer-2 routers and switches. One way to control the high volume of IP multicast data packets is to perform the periodic querying described above in order to update the multicast group membership to insure that the IP multicast data packets are only sent where actually needed. However, the IGMP control packets (i.e. the queries, joins, and leaves) generated by the routers, hosts, and switches to update the multicast group membership can cause periodic flooding of the network. For example, if a layer-3 router sends an IGMP query to all of the member hosts of a multicast group that is very large, as in all of the hosts tuned into HBO, then the resulting responses (sometimes referred to as membership reports) from each of the hosts that must be forwarded back to the layer-3 router can cause a tremendous burst of IGMP traffic to the layer-2 switch and across the link to the layer-3 router. As the typical connection between the layer-2 switch and the hosts is an Ethernet connection having a bandwidth of only 10 Mbps, a relatively small pipe, the system may simply be unable to handle such bursts of IGMP traffic.

Another drawback to supporting multicast routing is that when the host joins a multicast group, the layer-2 switch broadcasts the IGMP join packet to all of the other local hosts and adjacent routers. Thus, security for the users is impaired, since the hosts will know what groups their neighboring hosts have joined. As an example, when a digital cable television viewer tunes into HBO, all other viewers will be aware of that fact by virtue of receiving the broadcasted IGMP join packet showing that host as the source.

Yet another shortcoming to supporting multicast routing is that when a host leaves the IP multicast group, forwarding the IGMP leave packet to the layer-3 router that is originating the content for the group doesn't reduce the IP multicast traffic unless all of the hosts in the group have left. As a result, forwarding the IGMP leave packet to the layer-3 multicast router may be unnecessarily generating additional IGMP control packets across the expensive link to that router. Another problem can arise when the host experiences some catastrophic failure, such as a power outage, that prevents it from communicating the IGMP leave to the switch and router. In that case, the layer-3 multicast router may be unnecessarily generating IP multicast data packets to hosts that do not need them.

What is needed, therefore, is a way to reduce the multicast traffic generated between the routers and the switch, as well as between the switch and the hosts, to optimize traffic flow and increase scalability. To provide such a reduction in multicast traffic without interfering with the operation of the underlying IGMP protocol presents a unique set of challenges requiring a new and novel solution.

SUMMARY

According to one aspect of the invention, a method is provided to reduce multicast traffic by snooping IGMP control packets on a packet-forwarding device. A multicast traffic reducer includes an IGMP proxy, which operates in conjunction with an IGMP snooper to intercept selected IGMP control packets and generate proxy IGMP control packets in their place. The IGMP proxy may include an IGMP query batcher to consolidate IGMP queries to multicast host groups, an IGMP query responder to consolidate host responses to the IGMP queries to multicast host groups, and/or an IGMP leave forwarder to manage host IGMP leave packets. The IGMP proxy consolidates or discards host-generated IGMP control packets and timely generates IGMP proxy control packets in their place.

According to one aspect of the invention, the IGMP proxy further includes an IGMP layer-2 query generator to initiate IGMP queries for a layer-2 router multicast application.

According to one aspect of the invention, the multicast traffic reducer, including components IGMP Snooper, IGMP Proxy, IGMP query batcher, IGMP query responder, IGMP leave forwarder, and layer-2 query generator may be implemented on one or more network devices, such as a switch or other packet-forwarding device, such as a router or bridge.

In accordance with these and other aspects of the present invention, apparatus are provided for carrying out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method and system for multicast traffic reduction will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and apparatus is implemented in a switch, router, bridge, server or gateway, as a software routine, hardware circuit, firmware, or a combination thereof.

Parts of the description will be presented using terminology commonly employed by those skilled in the art to convey the substance of their work to others skilled in the art, including terms of operations performed by a network operating system, and their operands, such as transmitting, receiving, routing, login, packets, messages, user name, command, and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

It should be noted that while the description that follows addresses the method and system and apparatus therefor as it applies to a Local Area Network (LAN), it is appreciated by those of ordinary skill in the art that method is generally applicable to any Transport Control Protocol/Internet Protocol (TCP/IP)-based network including, but not limited to, internetworks, Virtual Local Area Networks (VLANs), Metropolitan Area Networks (MANs), and Wide Area Networks (WANs), as well as networks organized into subnets.

Figure 1:
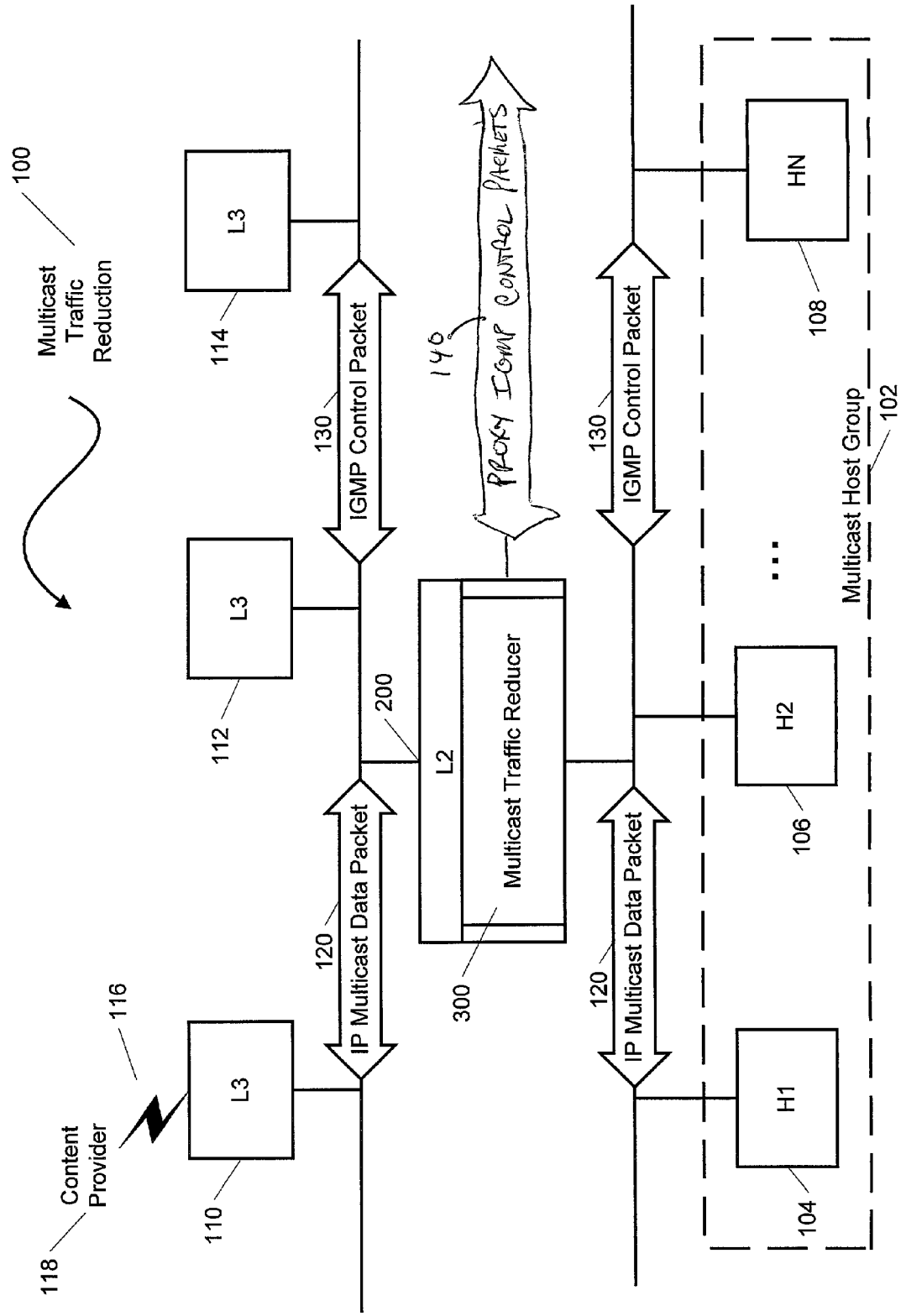
FIG. 1 is a block diagram illustrating a network configured in accordance with one embodiment of the present invention.

FIG. 1 is a block diagram illustrating a network configured in accordance with one embodiment of the present invention. As illustrated, the network includes a layer-2 packet-forwarding device 200, connecting hosts H1, H2, . . . HN 104, 106, 108, in multicast host group 102 to multicast layer-3 routers 110, 112, and 114. A content provider 118 communicates content via a communication link 116 to an originating layer-3 multicast router 110. The multicast router 110 generates IP multicast data packets 120 and IGMP control packets 130 to the host members 104, 106, and 108, of multicast host group 102 via the layer-2 packet-forwarding device 200. The layer-2 packet-forwarding device incorporates a multicast traffic reducer to intercept IGMP control packets 130 and, depending on the packet, discards the packets 130 or generates IGMP proxy packets 140 to take their place. The packet-forwarding device 200 is typically a layer-2 router such as a switch device that provides packet-forwarding services for packets destined for IP addresses connected to ports on the switch. Of course, numerous other configurations of end hosts, routers, and packet forwarding device may be employed without departing from the scope of the present invention.

Figure 2:
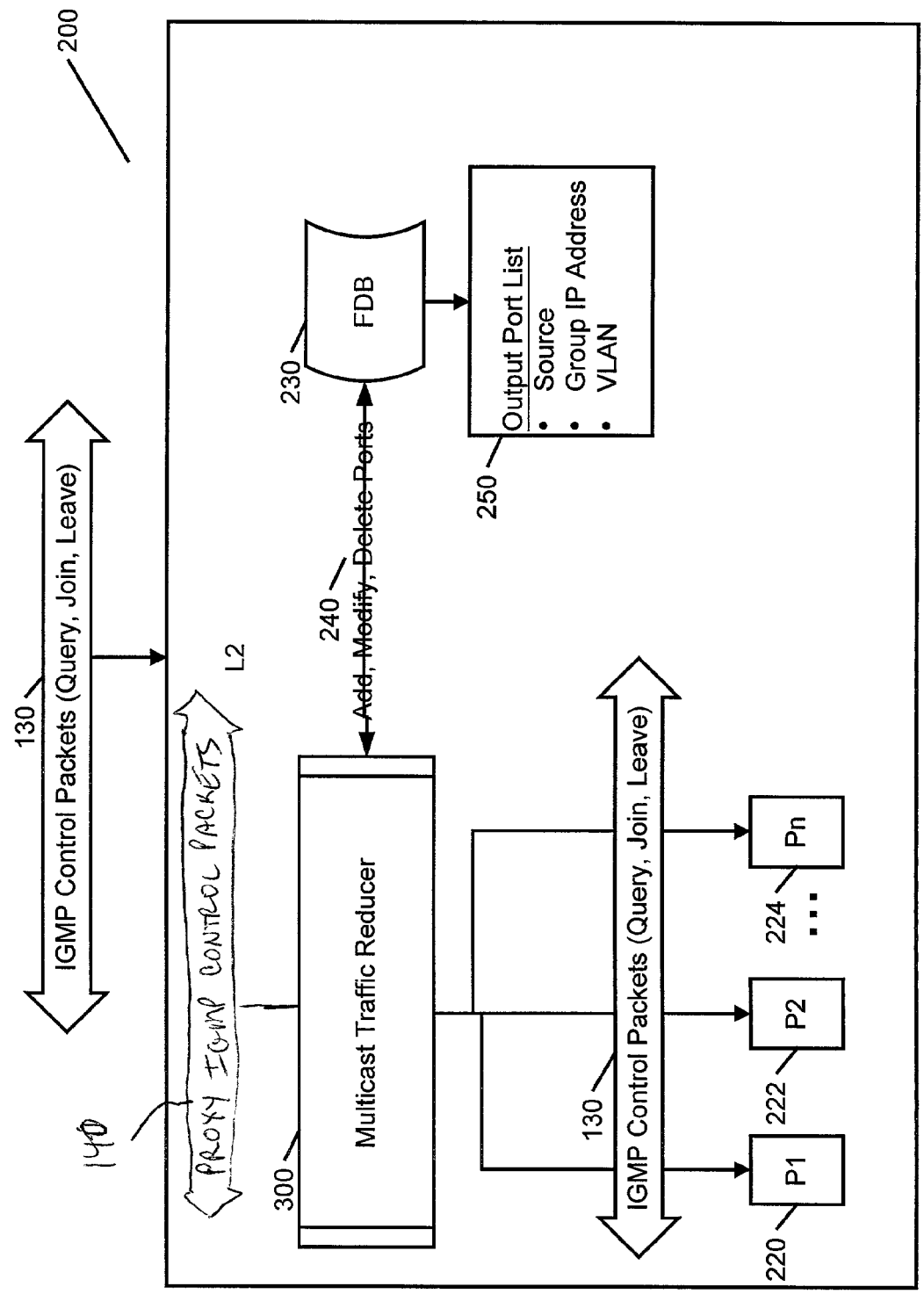
FIG. 2 is a block diagram illustrating selected components of the multicast traffic reduction of FIG. 1 in further detail in accordance with one embodiment of the present invention.

FIG. 2 is a block diagram illustrating selected components of the multicast traffic reduction 100 of FIG. 1 in further detail in accordance with one embodiment of the present invention. As illustrated, a multicast traffic reducer 300 operates in conjunction with a forwarding data base (FDB) 230 to maintain a cross-reference table/output port list 250 of the ports P1, P2, . . . PN, 220, 222, 224, of the packet-forwarding device 200 to which the hosts H1, H2, . . . HN, 104, 106, 108, of a particular multicast host group 102 are connected. The output port list 250 includes, among other data, the source IP address, the multicast group IP address, and the VLAN of each host by port identification. The information to build the output port list 250 is gleaned from the IGMP query, join, and leave packets generated by the hosts H1, H2, . . . HN, 104, 106, 108, and the layer-3 multicast routers 110, 112, and 114 using a technique referred to as IGMP snooping. Depending on the values in the IGMP control packets 130, the multicast traffic reducer intercepts or discards the IGMP control packets 130, and, if necessary, generates proxy IGMP control packets 140 in their place.

Figure 3:
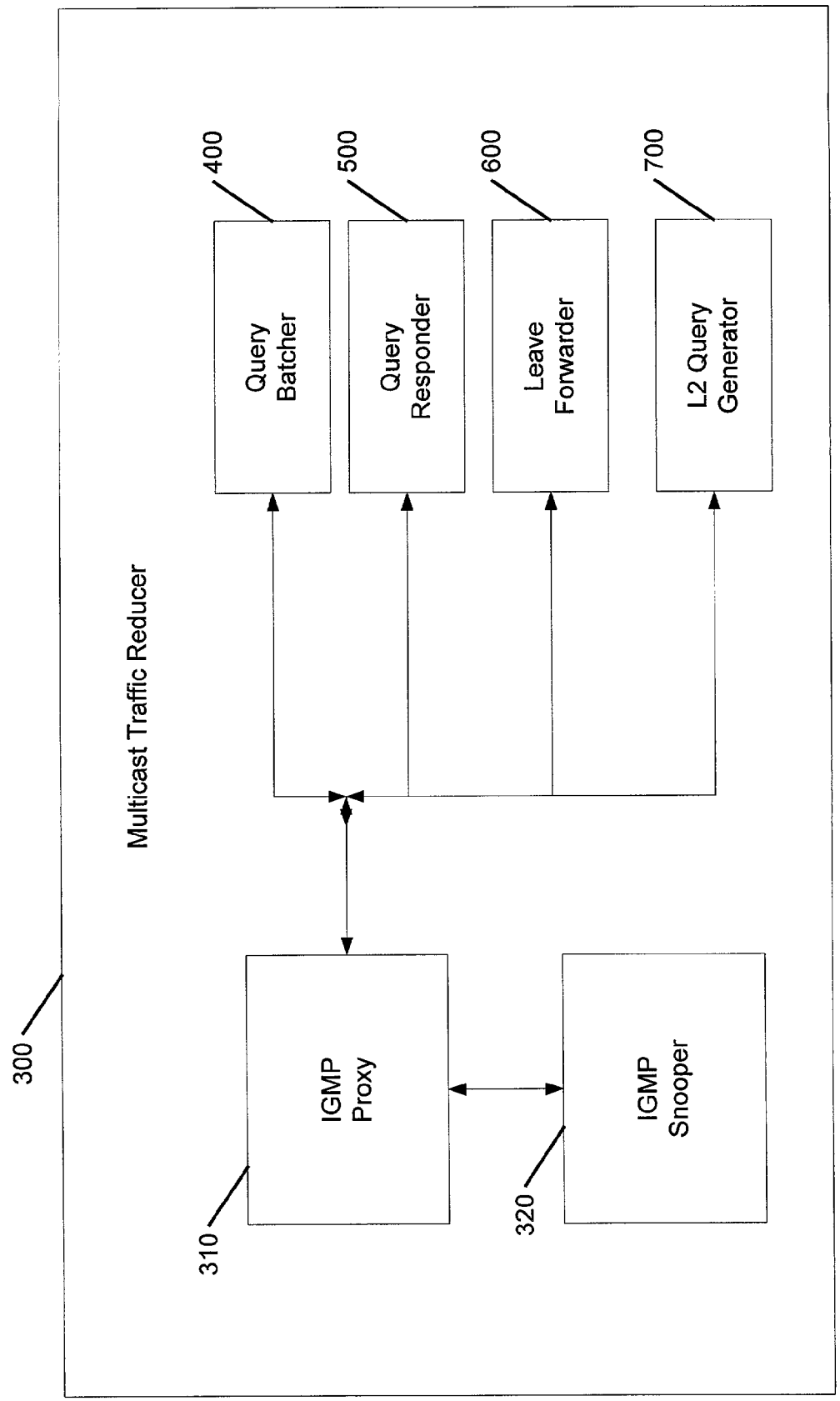
FIG. 3 is a block diagram illustrating selected components of a multicast traffic reducer of FIG. 2 in further detail in accordance with one embodiment of the present invention.

FIG. 3 is a block diagram illustrating the components of a multicast traffic reducer 300 in further detail in accordance with one embodiment of the present invention. As shown, the multicast traffic reducer 300 includes an IGMP proxy 310 operating in conjunction with an IGMP snooper 320. In one embodiment, the IGMP proxy 310 may further include a logic for a query batcher 400, a query responder 500, a leave forwarder 600, and a layer-2 query generator 700.

Referring to FIGS. 4–7, certain aspects of multicast traffic reduction 100 are shown. In particular, FIGS. 4–7 illustrate some of the acts to be performed by a computer executing a multicast traffic reducer 300 on a packet-forwarding device 200 that incorporates one embodiment of the invention. The particular methods of the invention are described in terms of software with reference to a series of flowcharts. In this context, the methods to be performed by a packet-forwarding device 200 incorporating an embodiment of the invention constitute computer programs made up of computer-executable instructions. Describing the methods by reference to a flowchart enables one skilled in the art to develop such programs including such instructions to carry out the methods on suitably configured computers or devices (i.e. the processor of the computer or other device executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems and network operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

Figure 4:
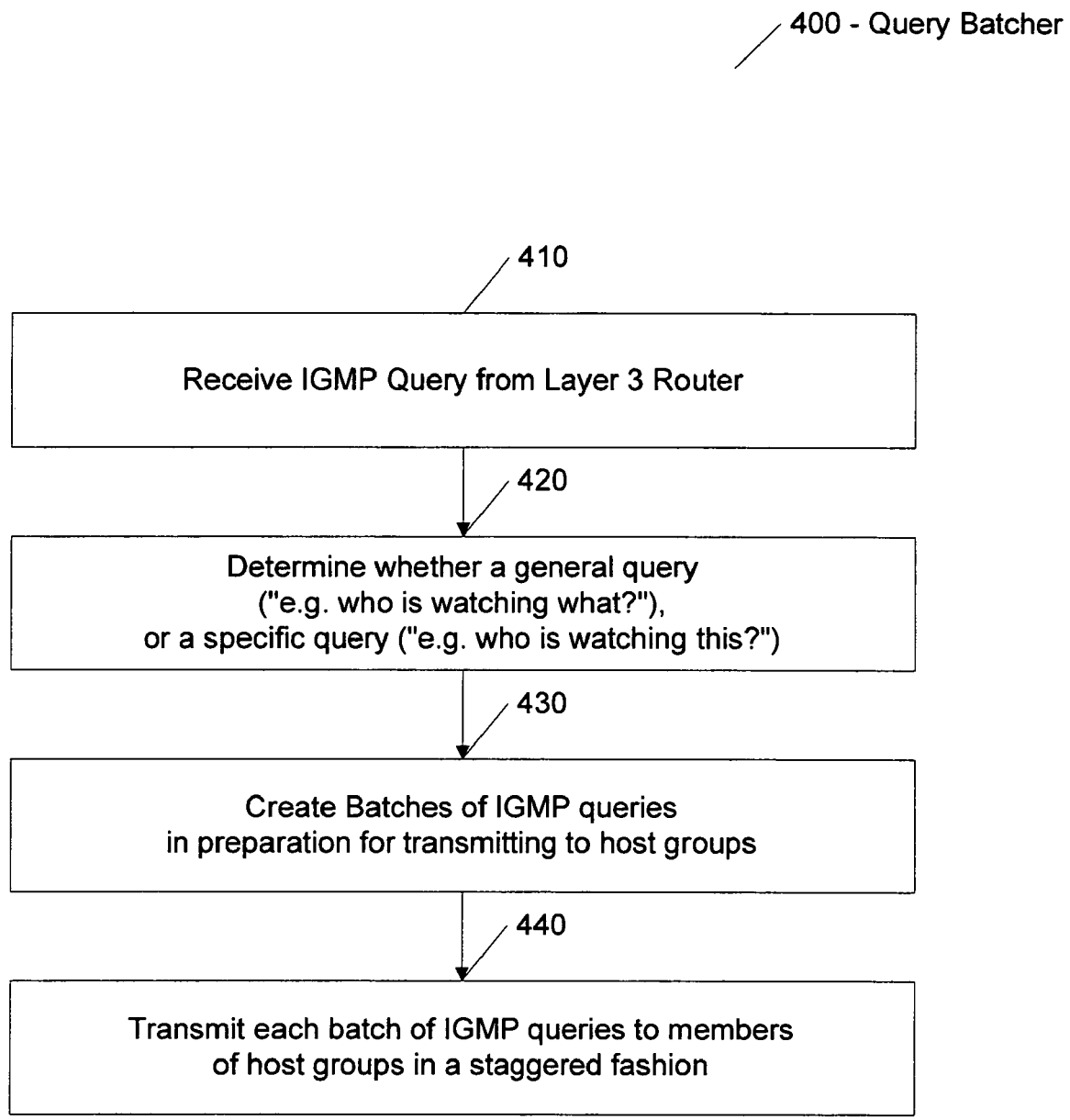
FIG. 4 is a flow diagram illustrating certain aspects of a method to be performed by a computer executing one embodiment of the illustrated invention shown in FIGS. 1–3.

In one embodiment, at processing block 410 of FIG. 4, the query batcher 400 receives an IGMP query control packet 130 from a layer-3 router and destined for the member hosts H1, H2, . . . HN, 104, 106, 108 of a multicast host group 102. At processing block 420, the query batcher determines whether the IGMP query 130 is a general query to multiple host groups, or a specific query to a particular host group. For example, in the context of digital cable television over IP, the general query is "Who is watching what?" and the specific query is "Who is watching this?" At processing block 430, the query batcher creates batches of IGMP queries in preparation for transmitting to the member hosts of one or more host groups as appropriate. For example, if an IGMP query is received that is destined for one thousand hosts belonging to one or more host groups, then the query generator 700 might batch the IGMP queries into groups of one hundred IGMP queries per batch. At processing block 540, the query batcher 400 initiates the transmission of each batch of IGMP queries to the individual member hosts in a staggered fashion to reduce the burst of IGMP traffic over the connections between the packet-forwarding device 200 and the hosts. In one embodiment, the choice of which IGMP queries are batched together depends on the host's IP destination address and associated port. However, the choice of which IGMP queries are batched together may vary without departing from the scope of the invention.

Figure 5:
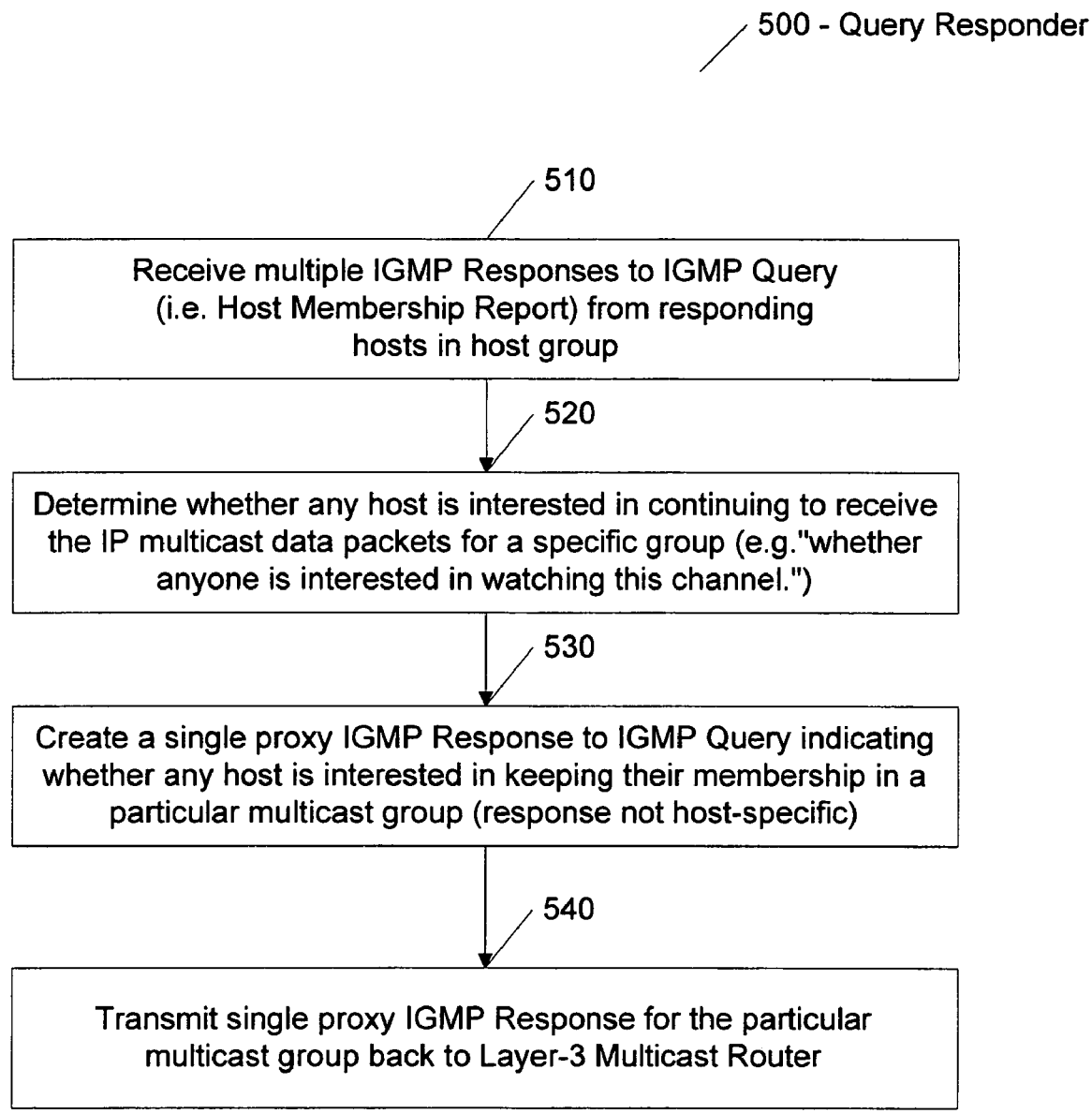
FIG. 5 is a flow diagram illustrating certain additional aspects of a method to be performed by a computer executing one embodiment of the illustrated invention shown in FIGS. 1–3.

In one embodiment, at processing block 510 of FIG. 5, the query responder 500 receives multiple IGMP responses from various responding hosts of a host group to an IGMP query to the host group. In one embodiment, the IGMP response can take the form of an IGMP membership report. At processing block 520, the query responder 500 determines from the IGMP responses whether any of the responding hosts is interested in continuing to receive the IP multicast data packets for a specific host group. For example, in the cable television scenario, the query responder 500 determines "whether anyone is interested in watching this channel, e.g. HBO"). At processing block 530, the query responder creates a single proxy IGMP response 140 to the IGMP query 130 to which the hosts were responding. The single proxy IGMP response 140 is not host-specific, but rather indicates whether there are any interested members of the specific host group as a whole that would require the continued transmission of the IP multicast data packets to the layer-2 packet-forwarding device 200 with which the specific host group is associated. At processing block 540, the query responder transmits the single proxy IGMP response 140 for the particular multicast group back to the layer-3 multicast router that initiated the IGMP query in the first place. The single proxy IGMP response 140 takes the place of the multiple host-generated IGMP responses that would have otherwise been transmitted.

Figure 6:
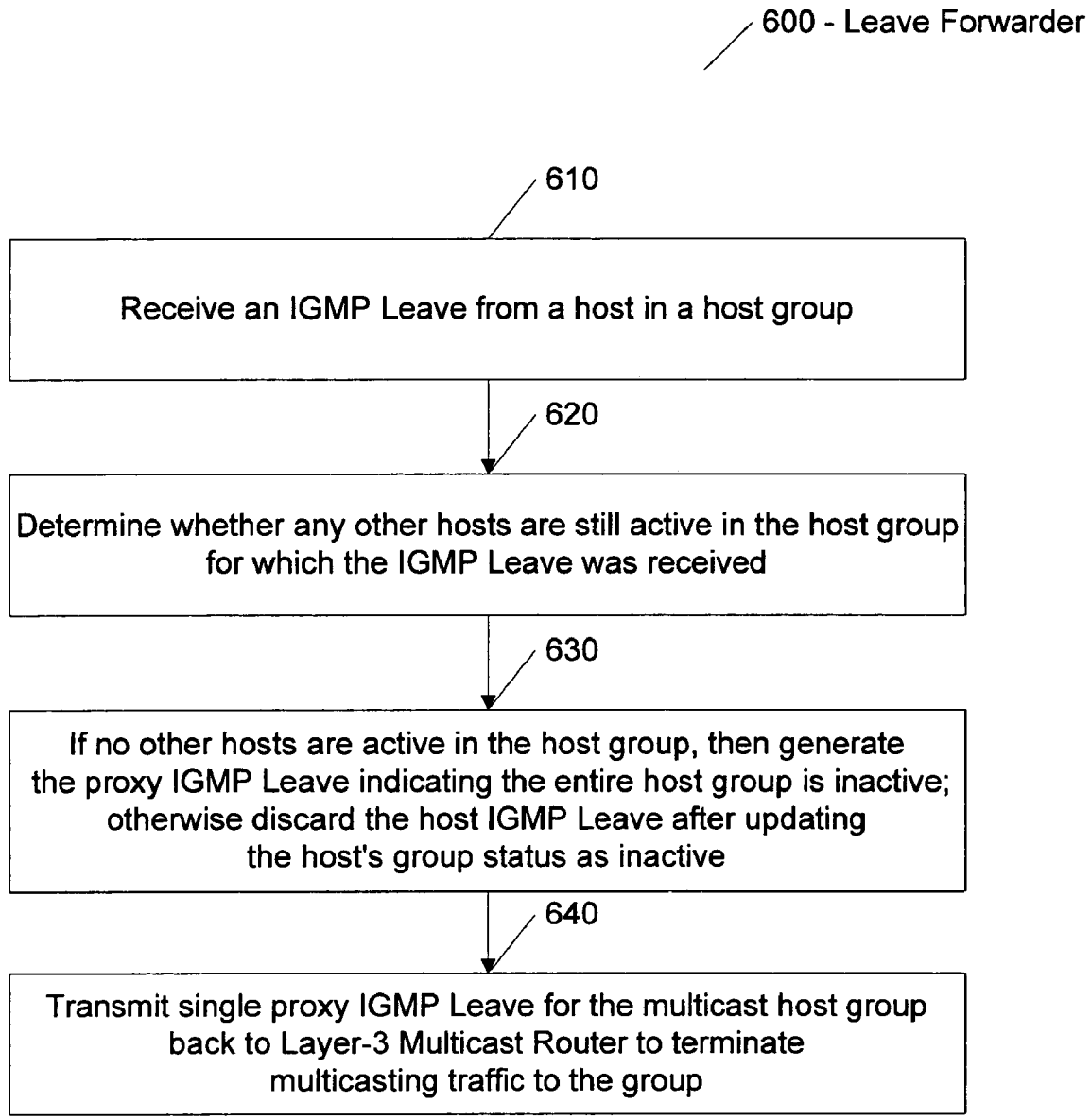
FIG. 6 is a flow diagram illustrating certain additional aspects of a method to be performed by a computer executing one embodiment of the illustrated invention shown in FIGS. 1–3.

In one embodiment, at processing block 610 of FIG. 6, the leave forwarder 600 receives an IGMP leave control packet from a host in a multicast host group. At processing block 620, the leave forwarder 700 determines whether any other hosts are still active in the host group for which the IGMP leave was received. The leave forwarder 600 makes this determination using the cross-reference table/output port list 250 maintained by the IGMP snooper 320. At processing block 630, if no other hosts are active in the host group (i.e., the host group has zero hosts), then the leave forwarder 600 generates the proxy IGMP leave 140 indicating the entire host group 102 is inactive. Otherwise, the leave forwarder 600 discards the host-generated IGMP leave 130 after updating the host's group status on the cross-reference table/output port list 250 to inactive. At processing block 640, if necessary, the leave forwarder 600 transmits the single proxy IGMP leave control packet 140 for the inactive multicast host group back to the layer-3 multicast router to terminate multicasting traffic to the group. In one embodiment, the leave forwarder 600 also periodically determines whether the hosts having an active status are actually alive. If not, the leave forwarder updates the status to inactive, and if there are no other active hosts for that multicast group, the leave forwarder performs processing blocks 630, and 640, to generate a proxy IGMP leave control packet 140 for the inactive host group.

Figure 7:
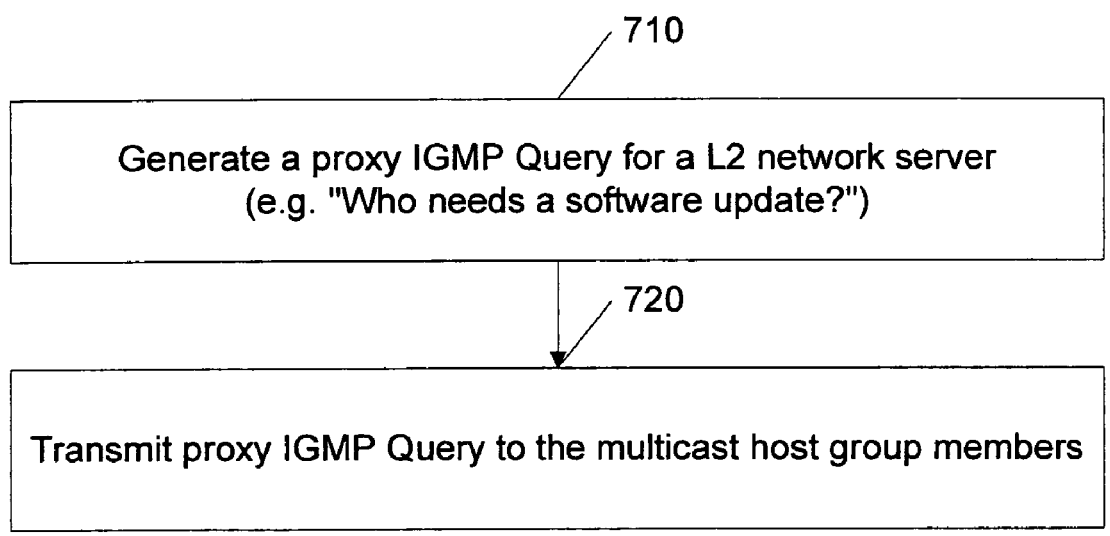
FIG. 7 is a flow diagram illustrating certain additional aspects of a method to be performed by a computer executing one embodiment of the illustrated invention shown in FIGS. 1–3.

In one embodiment, at processing block 710 of FIG. 7, an L2 query generator 700 generates a proxy IGMP query control packet 140 for a L2 network server. This is advantageous in a simple layer-2 network where there is no layer-3 multicast router to generate the IGMP query 130 that is needed to trigger an action such as a periodic software update among hosts connected to the L2 network server. At processing block 720, the L2 query generator 700 transmits the proxy IGMP query 140 to the multicast host group members, which may respond in accordance with the usual IGMP protocol.

Accordingly, a novel method and apparatus is described in which a multicast traffic reduction 100 reduces the amount of network traffic in a multicasting application. From the foregoing description, those skilled in the art will recognize that many other variations of the present invention are possible. In particular, while the present invention has been described as being implemented in a network comprising a packet forwarding device 200, a multicast traffic reducer 300, multicast routers 110, 112, and 114, component IGMP proxy 310, IGMP snooper 320, a forwarding database 230, one or more ports P1–PN, 220, 222, 224, and numerous hosts 104, 106, 108, and host groups 102, it should be noted that some of the logic described herein may be distributed in other components of a network or internetwork application without departing from the scope of the present invention.

For example, embodiments of the invention may be represented as a software product stored on a machine-accessible medium (also referred to as a computer-readable medium or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for multicast traffic reducer 310, the IGMP proxy 310, the IGMP snooper 320, and associated IGMP protocols can be stored on the machine-accessible medium. In addition, the data in the output port list 250 and associated forwarding database 230 may be stored in an internal storage area or on an external storage medium that is machine-accessible. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

What is claimed is:

1. A method, comprising:
    snooping group management query packets on a packet forwarding device, the queries associated with a transmission of multicast traffic to a host group in communication with the device; and
    processing the queries, including:
        batching multicast queries of a subset of the members of the host group; and
        transmitting each batch of multicast queries to each of the subsets of the members of the host group in a staggered fashion.

2. The method of claim 1, wherein the queries are received from a router that transmits the multicast traffic.

3. The method of claim 1, wherein the queries are generated by the packet forwarding device.

4. A method, comprising:
    snooping group management query response packets on a packet forwarding device, the responses associated with a transmission of multicast traffic to a host group in communication with the device; and
    processing the responses including:
        determining whether one or more response indicates that a member of the host group should continue to receive the transmission of multicast traffic;
        generating a single proxy response in accordance with the determination; and
        transmitting the proxy response on behalf of the host group.

5. An apparatus, comprising:
    a packet forwarding device, the packet forwarding device in communication with a host group; and
    a multicast traffic reducer coupled with the packet forwarding device, the multicast traffic reducer to:
        snoop group management query packets on the packet forwarding device, the queries associated with a transmission of multicast traffic to the host group; and
        process the queries to:
            batch multicast queries of a subset of the members of the host group; and
            transmit each batch of multicast queries to each of the subsets of the members of the host group in a staggered fashion.

6. The apparatus of claim 5, wherein the queries are received from a router that transmits the multicast traffic.

7. The apparatus of claim 5, wherein the queries are generated by the packet forwarding device.

8. An apparatus, comprising:
    a packet forwarding device, the packet forwarding device in communication with a host group; and
    a multicast traffic reducer coupled with the packet forwarding device, the multicast traffic reducer to:
        snoop group management query response packets on the packet forwarding device, the responses associated with a transmission of multicast traffic to the host group; and
        process the responses to:
            determine whether one or more response indicates that a member of the host group should continue to receive the transmission of multicast traffic;
            generate a single proxy response in accordance with the determination; and
            transmit the proxy response on behalf of the host group.

9. An article of manufacture, comprising:
    a machine-accessible medium providing content that, when accessed by a machine, causes the machine to:
        snoop group management control query packets on a packet forwarding device, the queries associated with a transmission of multicast traffic to a host group in communication with the device; and process the queries to:
   batch multicast queries of a subset of the members of the host group; and
   transmit each batch of multicast queries to each of the subsets of the members of the host group in a staggered fashion.

10. The article of manufacture of claim 9, wherein the query is received from a router that transmits the multicast traffic.

11. The article of manufacture of claim 9, wherein the query is generated by the packet forwarding device.

12. An article of manufacture comprising:
   a machine-accessible medium providing content that, when accessed by a machine, causes the machine to:
      snoop group management control response packets on a packet forwarding device, the responses associated with a transmission of multicast traffic to a host group in communication with the device; and
   process the responses to:
      determine whether one or more response indicates that a member of the host group should continue to receive the transmission of multicast traffic;
      generate a single proxy response in accordance with the determination; and
      transmit the proxy response on behalf of the host group.

* * * * *